3,249,679
PROTECTIVE COVER FOR ELECTRICAL CONNECTIONS AND THE LIKE
Stephen B. Bogese, Roanoke, Va., assignor to Virginia Plastics Company, Roanoke, Va., a corporation of Virginia
Filed Oct. 2, 1964, Ser. No. 401,143
7 Claims. (Cl. 174—5)

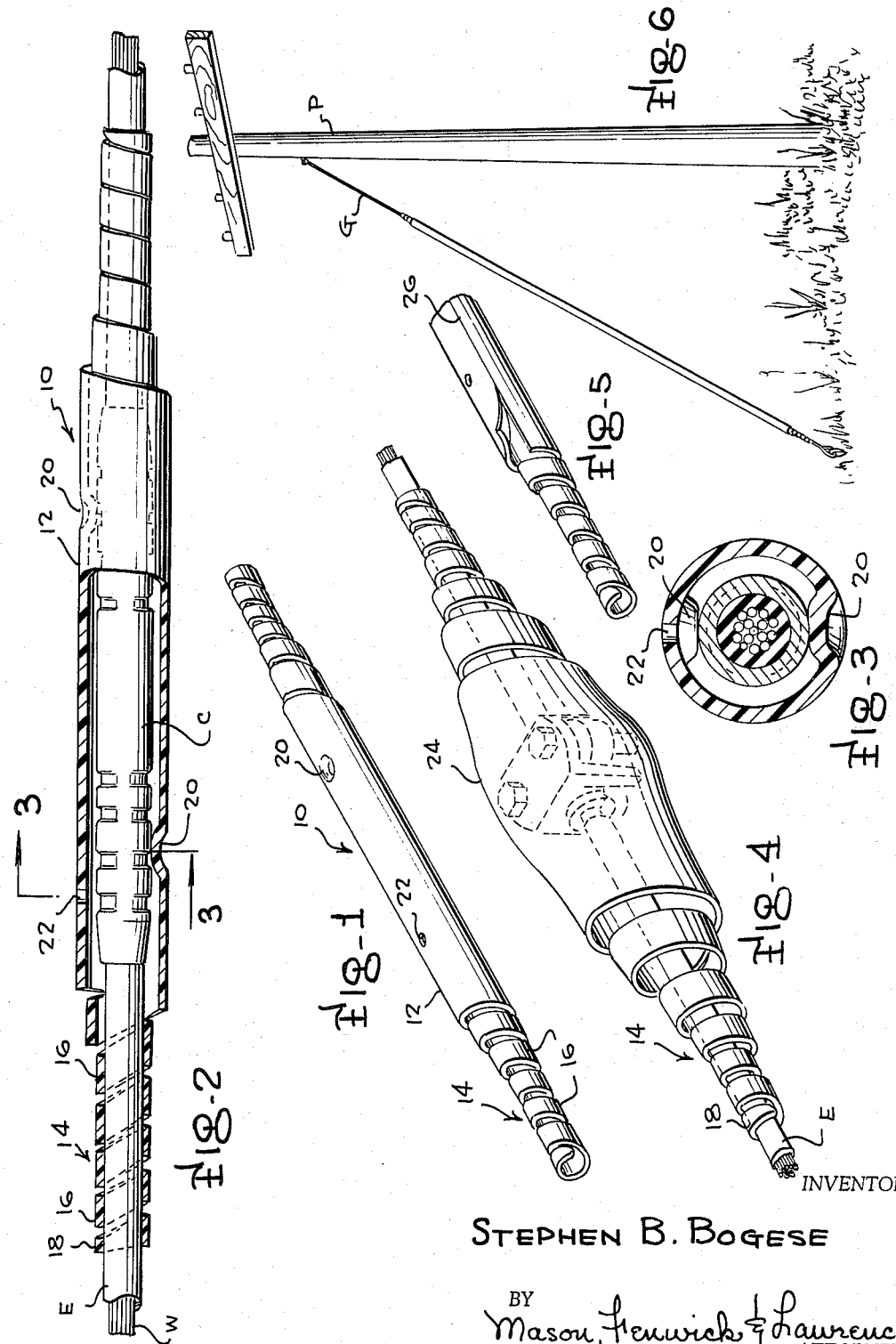

This invention relates generally to a protective cover for elongated members such as electrical connections, wires, and the like. More particularly, the present invention is concerned with a plastic protective covering for electrical connections and wires and the like which insulates the wires or which protects the insulation presently around the wire.

The prior art is replete with numerous insulation covers and protectors for electrical connections, wires, and the like. However, none are known to possess the unique ability of being easily secured in place at the location of the connection or at a designated position along the wire with ease, and yet offer assurance of remaining in position. The prior art frequently has used wrappings and covers with clasps or bolts securing the covers in position. While effective in protecting the connection or wire, the installation is relatively time consuming and often requires use of tools.

Accordingly, it is one of the principal objects of the present invention to provide a protective cover for electrical connections or wires which can be easily and conveniently installed without use of any tools.

It is also an object of the present invention to provide a protective cover for elongated members which retains itself in any predetermined position.

Another object of the present invention is to provide a protective cover which can be installed intermediate the ends of an elongated member and grips the elongated member to retain itself in position.

A further and more particular object of the present invention is the provision of a spiral gripping pigtail on the protective cover.

A further object of the present invention is to provide a method for forming the protective cover of the present invention.

Other objects and advantages of the present invention will become apparent to those skilled in the art from the following description when read in conjunction with the accompanying drawing, wherein:

FIG. 1 is a perspective view of the protective cover of the present invention.

FIG. 2 is a side elevational view, partly broken away, of the protective cover shown in FIG. 1, also showing the electrical connection.

FIG. 3 is a cross-sectional view taken along the lines 3—3 of FIG. 2 showing the holding means contacting the electrical connection.

FIG. 4 is a perspective view of another embodiment of the present invention showing a different shape in order to use a clamp-type wire connection.

FIG. 5 is a perspective view partly broken away of another embodiment of the present invention illustrating the longitudinal split in the cover.

FIG. 6 is a perspective view of the protective cover position on a guy wire support for a telephone pole.

Briefly, the present invention embodies a tubular member having at least one end spiral gripping means in the form of a drawn or axially extended spiral and includes holding means in the form of internal indentations in the body of the tubular member to retain the covering position.

Additionally, the present invention includes a method for fabricating the present cover.

In FIGS. 1 and 2 is shown a protective cover indicated generally at 10. Cover 10 is preferably formed from any flexible conventional plastic material, polyvinylchloride, polyethylene, and the like which are used as electrical insulation materials. The cover 10 is essentially composed of a tubular member 12 which is open-ended and initially free of obstruction in its interior. The internal diameter of the tubular member is not critical, but it has been found that a one-inch diameter is a convenient size since it can be used to cover an infinite series of connections ranging from one-quarter to seven-eighths inch in diameter. The thickness of the tubular member is also not critical to the present invention. However, thicknesses in the range of one-eighth inch have been found to be suitable since they form a substantially rigid tubular member 12 providing the necessary flexibility.

As will be best seen from FIG. 2, the ends of the tubular member are provided with an integral series of convolutions 14 in the form of an extended spiral. The convolutions are formed from the tubular member and extend in a series of convoluted bands 16, the internal diameter of which is considerably reduced from the diameter of the tubular member. The diameter of the last convolution 18 may be about three-eighths to one-half inch in diameter while the width of the bands may be between one-quarter to three-quarters of an inch or greater depending upon the type and thickness of the material used.

As shown, the convoluted bands 16 are of diminishing axial width ranging from about three-quarters of an inch for the band closest to the tubular member down to about one-eighth of an inch at the end of the last convolution 18. The bands 16 are preferably spaced from adjacent bands sufficiently in order not to overlap when positioned upon the elongated member E which is shown in FIG. 2 as embodying a conventional electrical conductor or wire W having a conventional connector C.

The convolutions 14 which are formed by the bands 16 may conveniently be referred to as a pigtail shaped in the form of an extended spiral. It is not critical that each convolution be such as to have lesser radial extent than the adjacent convolution nearer the tubular body, but rather it is only important that the internal radial extent of the convolution is not greater than the adjacent convolution which is closer to the tubular member. In other words, the convolutions can be of equal radial extent as long as such radial extent is of lesser magnitude than the internal diameter of the tubular member, or the convolutions may graduate uniformly or non-uniformly from the internal diameter of the tubular member down to the last convolution 18 as long as no convolution more distant from the tubular member is of greater internal radial extent than the preceding convolution.

The pigtail composed of the convolutions 14 thus can be wrapped around the electrical conductor, and the convolutions actually form a gripping means to securely hold the protective cover 10 onto the electrical conductor and therefore around the electrical connection C.

In order to retain position of the tubular member axially and circumferentially of the connection C, the tubular member is provided with at least one holding means 20, best shown at FIG. 3, which is in the form of an indentation into the interior of the tubular member thus contacting the electrical connection and aiding to prevent relative movement between the cover and the connector.

The tubular member is also provided with ports 22 which communicate with the interior of the tubular member and act as drain holes for accumulated moisture.

FIG. 4 is another embodiment of the present invention and is shown covering a bolted connector (shown in phantom lines of FIG. 4). This tubular body 24 is bulbous in order to accommodate the bolted connection within the cover. The tubular member in this instance may be several inches in diameter and may be formed in shapes other than round. In any event, the convolutions 14 and the bands 16 are in proportional size in order to grip the electrical conductor forming the elongated member E.

In order to install the protective cover, it is merely necessary to insert one end of the wire to be connected through the tubular member with the pigtails bent backwardly substantially into contact with the upper surface of the tubular member. In this manner, the end of the wire or other elongated member may be inserted easily. The connection may then be made, and the tubular member slid back to cover the connection, at which time the pigtail is wrapped around the ends of the wire that protrude from the tubular member while maintaining the wire position during the wrapping within the spaces between the adjacent convolutions in order to arrive at the wrapped position shown in FIG. 2. The convolutions will when fully wrapped on the elongated member E retain the protective cover in position.

It is also found desirable to utilize the protective cover upon a continuous elongated member such as the guy wire supporting pole P shown in FIG. 6. In order to achieve this purpose, the tubular member is severed at 26 as shown in FIG. 5 along its axial length thus permitting the tubular member to be parted and enabling it to be received around the guy wire G or other elongated continuous member. As shown, the severance 26 is made at a point along the surface of the tubular member which is substantially opposite to the point on the tubular member forming the first convolution.

The protective cover according to the present invention has been uniformly formed by cutting the surface of the tubular member to form helical convolutions up to any desired distance from either or both ends of the tubular member. These convolutions are then wrapped around a heated mandrel which is heated below the melting temperatures, but above the softening temperature of the plastic which, in the case of polyvinylchloride, for example, is between the range of 150° F. to 360° F. By wrapping the convolutions about the heated mandrel, the internal diameter of the plastic convolutions will be set to the external diameter of the mandrel, the latter being of an external diameter less than the internal diameter of the tubular member. The convolutions should remain upon the mandrel for a sufficient time to cool it to approximately 100° F. Alternatively, the pigtails may be set in their drawn spiraled condition by dipping the pigtails into a cooling bath of water at ambient temperature for approximately thirty seconds, or until the pigtails are cooled below 100° F.

It has been found that the protective cover in accordance with the present invention can be used not only on guy wires, but is of great value to protect cables and insulated wires from abrasion due to rubbing contact with trees that such wires or cables may pass through. The protective cover shown in FIGURE 5 may easily be installed to protect the insulation from the constant abrasion of the trees. The split tube may also be cemented, if desired, to achieve a complete tube body after installation.

From the foregoing detailed description it will be evident that there are a number of changes, adaptations, and modifications of the present invention which come within the province of those skilled in the art; however, it is intended that all such variations not departing from the spirit of the invention be considered as within the scope thereof as limited solely by the appended claims.

I claim:

1. A protective cover for an elongated member comprising a tubular member, a flexible pigtail shaped in the form of a drawn spiral and having a fixed end and a free end, the tubular member having at least one pigtail secured at the fixed end to one end of the tubular member, the pigtail having convolutions of lesser radial extent than the tubular member to form gripping means for contact with said elongated member.

2. A protective cover for an elongated member comprising a tubular member, a flexible pigtail shaped in the form of a drawn spiral and having a fixed end and a free end, the tubular member having at least one pigtail secured at the fixed end to one end of the tubular member, the pigtail having convolutions of lesser radial extent than the tubular member to form gripping means for contact with said elongated member, and elongated member holding means positioned within and extending radially inwardly from said tubular body.

3. A protective cover for an elongated member comprising a tubular member, a pigtail formed integrally with each end of said tubular member, said pigtail being shaped in the form of a drawn spiral, each convolution of said spiral being in the form of a band and having lesser radial extent than the tubular member to form gripping means for contact with said elongated member, and an opening positioned in and extending the length of the tubular member.

4. A protective cover for an elongated member comprising a tubular member, a flexible pigtail shaped in the form of a spiral and having a fixed end and a free end, the tubular member having at least one pigtail secured at the fixed end to one end of the tubular member, said spiral having convolutions which extend axially along the axis of the spiral such that each convolution is spaced from adjacent convolutions, said convolutions having lesser radial extent than said tubular member to form gripping means for contact with said elongated member.

5. A protective cover for an elongated member comprising a tubular member, a flexible pigtail shaped in the form of a spiral and having a fixed end and a free end, the tubular member having at least one pigtail secured at the fixed end to one end of the tubular member, said spiral having convolutions which extend axially along the axis of the spiral such that each convolution is spaced from adjacent convolutions, said convolutions having lesser radial extent than said tubular member to form gripping means for contact with said elongated member, and an opening positioned in and extending the length of the tubular member.

6. A protective cover for an elongated member comprising a tubular member, a flexible pigtail shaped in the form of a spiral and having a fixed end and a free end, the tubular member having at least one pigtail secured at the fixed end to one end of the tubular member, said spiral having convolutions which extend axially along the axis of the spiral such that each convolution is spaced from adjacent convolutions, said convolutions having lesser radial extent than said tubular member to form gripping means for contact with said elongated member, and elongated member holding means positioned within and extending radially inwardly from said tubular body.

7. A protective cover for an electrical connection comprising a tubular member, a flexible pigtail shaped in the form of a spiral and having a fixed end and a free end, the tubular member having at least one pigtail secured at the fixed end to one end of the tubular member, said spiral having convolutions which extend axially along the axis of the spiral such that each convolution is spaced from adjacent convolutions, said convolutions having lesser radial extent than said tubular member to form gripping means for contact with said connection, elongated member holding means positioned within and extending radially inwardly from said tubular body, and an opening positioned in and extending the length of the tubular member.

References Cited by the Examiner

UNITED STATES PATENTS

| | | | |
|---|---|---|---|
| 743,346 | 11/1903 | Swain | 174—84 |
| 2,065,315 | 12/1936 | Keath | 174—5 X |
| 3,173,989 | 3/1965 | Neaderland | 174—84 |

FOREIGN PATENTS

| | | |
|---|---|---|
| 1,201,116 | 7/1959 | France. |
| 406,410 | 3/1934 | Great Britain. |
| 447,471 | 5/1936 | Great Britain. |
| 566,679 | 1/1945 | Great Britain. |

ROBERT K. SCHAEFER, *Primary Examiner.*

LARAMIE E. ASKIN, *Examiner.*